United States Patent
Suit

(10) Patent No.: US 9,575,781 B1
(45) Date of Patent: Feb. 21, 2017

(54) AUTOMATIC DETERMINATION OF A VIRTUAL MACHINE'S DEPENDENCIES ON STORAGE VIRTUALIZATION

(75) Inventor: John Michael Suit, Mount Airy, MD (US)

(73) Assignee: Open Invention Network LLC, Durham, NC (US)

( * ) Notice: Subject to any disclaimer, the term of this patent is extended or adjusted under 35 U.S.C. 154(b) by 0 days.

(21) Appl. No.: 13/478,491

(22) Filed: May 23, 2012

Related U.S. Application Data

(60) Provisional application No. 61/488,900, filed on May 23, 2011.

(51) Int. Cl.
*G06F 15/173* (2006.01)
*G06F 9/455* (2006.01)

(52) U.S. Cl.
CPC .................... *G06F 9/455* (2013.01)

(58) Field of Classification Search
CPC ...... G06F 9/455; G06F 9/505; G06F 11/3419; G06F 11/3433; G06F 11/3466; G06F 9/45558; G06F 2009/45591; G06F 2201/815; G06F 11/349; G06F 9/46; H04L 67/1008; H04L 67/1097
See application file for complete search history.

(56) References Cited

U.S. PATENT DOCUMENTS

| | | | | |
|---|---|---|---|---|
| 7,861,224 B2* | 12/2010 | Petrov et al. | | 717/122 |
| 7,861,244 B2* | 12/2010 | Vasile | | G06F 11/3409 718/1 |
| 8,321,558 B1* | 11/2012 | Sirota | | G06F 9/5011 709/201 |
| 8,336,050 B2* | 12/2012 | Dake | | G06F 9/546 711/147 |
| 2007/0136402 A1* | 6/2007 | Grose | | G06F 12/0253 |
| 2008/0172539 A1* | 7/2008 | Boss | | G06F 3/0605 711/165 |
| 2009/0172666 A1* | 7/2009 | Yahalom | | G06F 3/0605 718/1 |
| 2011/0022812 A1* | 1/2011 | van der Linden | | G06F 9/5077 711/163 |
| 2012/0167083 A1* | 6/2012 | Suit | | G06F 11/0712 718/1 |
| 2012/0266164 A1* | 10/2012 | Anderson, III | | G06F 9/5077 718/1 |
| 2014/0215076 A1* | 7/2014 | Grothues | | G06F 9/455 709/226 |

* cited by examiner

*Primary Examiner* — Moustafa M Meky
*Assistant Examiner* — Kidest Mendaye
(74) *Attorney, Agent, or Firm* — Haynes and Boone, LLP

(57) ABSTRACT

Disclosed are examples of observing and measuring virtual machine (VM) activity in a VM communication system environment. According to one example embodiment, an example operation may include transmitting a request from a physical host device to monitor at least one virtual machine among various virtual machines currently operating in a virtual communication system. Additional operations may include determining which of the virtual machines are actively accessing a predetermined virtual application, such as a virtual storage application. The operations may also include receiving present operating activity results regarding the virtual machines responsive to the transmitted request.

20 Claims, 4 Drawing Sheets

AUTOMATIC DETERMINATION OF A VIRTUAL MACHINE'S DEPENDENCIES ON STORAGE VIRTUALIZATION

CROSS-REFERENCE TO RELATED APPLICATIONS

This application claims benefit to provisional application 61/488,900, entitled "SYSTEM AND METHOD FOR THE AUTOMATIC DETERMINATION OF A VIRTUAL MACHINE'S DIRECT AND INDIRECT DEPENDENCIES ON STORAGE VIRTUALIZATION", filed on May 23, 2011, the entire contents of which are hereby incorporated by reference.

TECHNICAL FIELD OF THE INVENTION

The present invention is generally related to an automated virtual machine monitoring application, and more particularly, to an application configured to monitor virtual machine activity over a predefined interval of time to determine virtual machine dependencies in an enterprise network environment.

BACKGROUND OF THE INVENTION

Currently, traditional enterprise networks and related communication infrastructures may include various network nodes that contribute to an overall network function and/or business process. The network nodes may include both physical and virtual machines. Enterprise networks may include virtual machines in which case physical hosts are required to provide an allocation of resources. The physical hosts are vulnerable to disruptions in service due to hardware failures. Virtual hosts are especially vulnerable due to their dynamic utilization by multipliable input/output (IO) elements. As with physical hosts, hardware devices that provide physical storage that is then converted into virtual storage is also vulnerable to attacks and security flaws.

The result of virtualization of storage as well as utilizing a redundant array of independent disks (RAID) data storage technology is to minimize the effect of a hardware failure. Knowing a virtual machine's usage dependency and/or reliance on an available virtual storage would reduce the effect of a hardware failure on the user or a system associated with the virtual machine.

SUMMARY OF THE INVENTION

An example embodiment of the present invention may include a method of transmitting a request from a physical host device to monitor at least one virtual machine among a plurality of virtual machines currently operating in a virtual communication system. The method may also include determining which of the plurality of virtual machines are actively accessing a predetermined virtual application, and receiving present operating activity results regarding the plurality of virtual machines responsive to the transmitted request.

Another example embodiment of the present invention may include an apparatus including a transmitter configured to transmit a request from a physical host device to monitor at least one virtual machine among a plurality of virtual machines currently operating in a virtual communication system. The apparatus may also include a processor configured to determine which of the plurality of virtual machines are actively accessing a predetermined virtual application, and a receiver configured to receive present operating activity results regarding the plurality of virtual machines responsive to the transmitted request.

DETAILED DESCRIPTION

Figure 1:
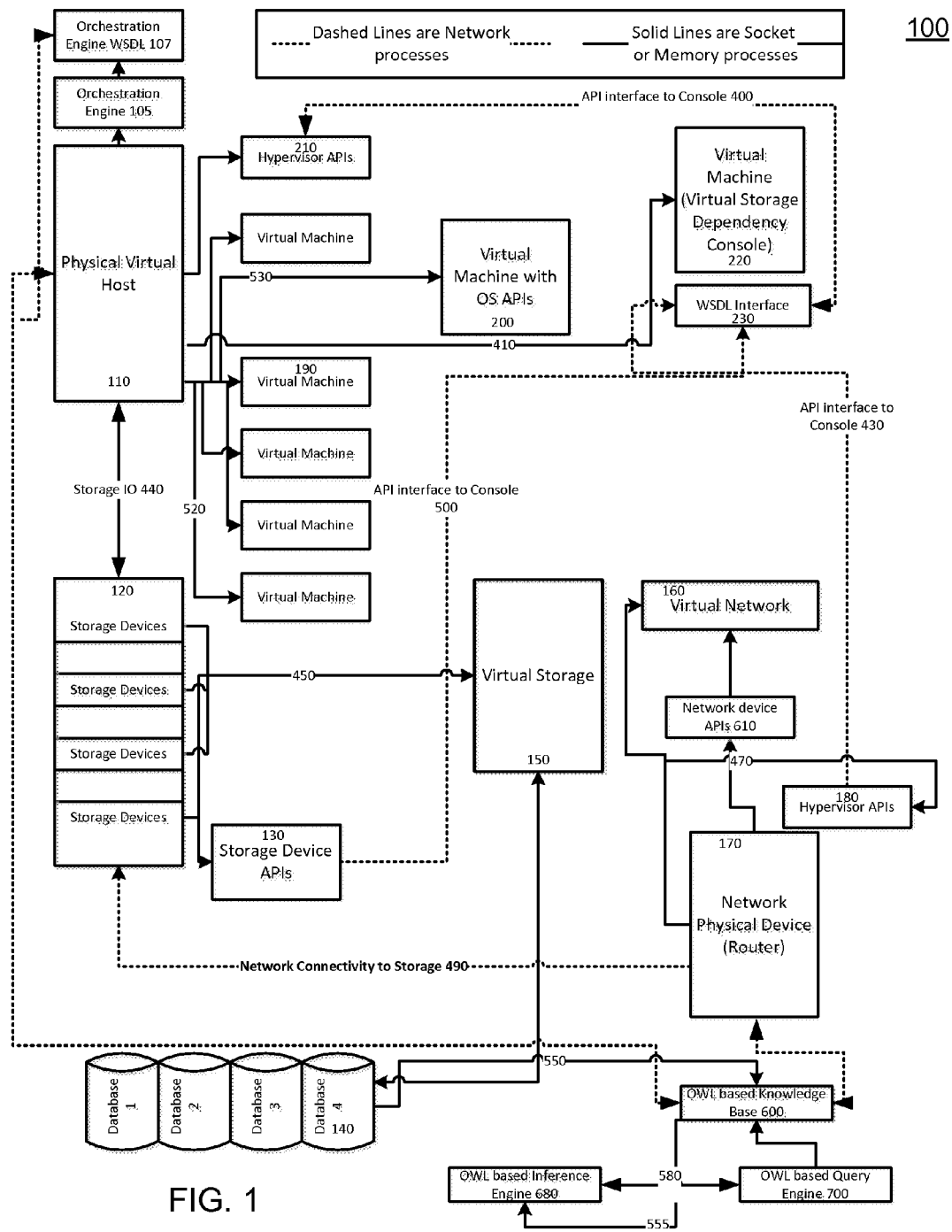
FIG. 1 illustrates a logic diagram of a virtual machine communication interface of a virtual storage configuration system according to example embodiments.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

In one aspect of the disclosure, there is provided a method for identifying candidate virtual machine dependencies within an enterprise network that includes a plurality of entities contained within a knowledge base. In one example method, one or more virtual machines including one or more nodes may be categorized. For example, an automatic determination may be performed to determine a virtual machine's direct and/or indirect dependencies on network resources, such as virtual data storage.

According to one example, a determination unit, processor and/or a virtual machine (VM) application may operate by automatically detecting a virtual machine's usage of a given virtual storage resource. Over a predefined period of time, the VM application may develop a profile of optimum usage for the virtual machine based on an example time period of observation. The VM application may gather information by performing signal intelligence or intelligence gathering by interception of signals based on signal interception (SIGINT) traffic analysis. By employing SIGINT information gathering and analysis techniques, the application will determine an optimum virtual storage metric(s) (e.g., memory size, memory access times, memory access frequency, read/write operations performed, file storing size required, etc.) for the virtual machine to be dependent.

In operation, the virtual machine application will first detect the connectivity between one or more virtual machines and a corresponding storage device via a virtual management vendor's application programming interface (APIs). The connectivity established by the virtual machine may be monitored for a period of 24 hours, 40 hours and/or 72 hours to establish a virtual storage usage baseline. Based on the determined virtual storage usage and resulting changes in state provided by the virtual management vendor's APIs in combination with the usage data received from within the virtual machine's OS, an optimal interaction level between the virtual machine and the virtual storage may be determined. The VM application may process the collected information using a SIGINT algorithm, and additional factors may also be considered, such as the speed of the storage, capacity, recovery from fault tolerances, and other variables provided by the virtual storage vendor(s).

The components used to monitor virtual machine usage may be integrated into a typical enterprise virtualization implementation. For example, the typical enterprise network setup includes various components used to emulate a physical enterprise computing environment. These components may be setup to efficiently exchange data and process information for business applications. The enterprise components required to perform the VM monitoring may include at least one physical host, a network device, such as a virtual router capable of virtual networking, and physical routers capable of providing network access to the physical network infrastructure. At a minimum, one storage device capable of providing access to a virtual infrastructure may be required to accurately measure virtual machine utilization.

FIG. 1 illustrates a logic diagram of a virtual storage system configuration according to example embodiments. Referring to FIG. 1, the VM application components may include a hypervisor management platform such as a VMWARE® ESX server (physical virtual host 110), VMWARE VSPHERE® management software, MICROSOFT® HYPER-V®, MICROSOFT® SCVMM, MICROSOFT® 2008 Server, a virtual storage Vendor's API (storage vendors 120), a database such as SQL SERVER® (database 140) and/or ORACLE®, and a web based console server (virtual machine virtual storage dependency console 220). An inference engine may be used, such as Jena or Semweb (ontology web language (OWL) inference engine 680), and a semantic web knowledge base, (OWL based knowledge base 600).

In operation, the console web service definition language (WSDL) interface 230 may transmit a request for the enterprise virtualization information from the various APIs, such as hypervisor API 180, storage device API 130 via an API interface to the console 500, as illustrated in the architecture of FIG. 1. This WSDL interface 230 may be utilized by the VM application to provide both data and control input and output for the corresponding virtual storage system of FIG. 1. By using this type of WSDL interface 230, the virtual storage system may be distributed and managed within an enterprise or external cloud environment. The WSDL interface 230 may connect to the hypervisor API 210 via an API interface and/or console hardwire connection 400.

The APIs 180, 130 and 500 are used to submit requests to monitor and/or audit the virtual storage activity performed by the virtual machines and return results regarding the active virtual machines and their virtual storage connectivity. The hypervisor API 180 provides a detailed list of the virtual machines 190 associated with and operating in the virtual environment. For example, the hypervisor API 180 may provide details regarding the virtual machines' 190 hosts, resource allocation, network configuration (network device APIs 610), and storage configuration (storage device APIs 130), etc.

The VMs 190 may be controlled by receiving a procedure contained within the virtual infrastructure for distribution of instructions to the virtual machines' operating systems 210 to provide dynamic network connectivity of the virtual machines 190 to other virtual and physical machines in the operating environment. The information requests may be generated through the WSDL 220 at a default interval of once every so many minutes (e.g., 5, 10 and 20 minutes). This default interval setting is established to provide accurate update information without impacting the performance of the virtual environment. The virtual machine OS application programming interface (API) 200 may provide information regarding a particular host, VM name, present time, type of connection established, duration of connection(s), storage capacity information, packets (PKT) transferred count, bits transferred count, origination source, and storage destination address. The VM information may be stored locally via a VM operating engine (i.e., local computer, remote computer, etc.) or may be relayed periodically to a remote third party information storage engine.

The VM information may be formatted into a tabular delimited format such as a comma separated value (CSV) file. Each line in the record is processed by a SIGINT based frequency algorithm contained within the inference engine 680 that creates an optimum record observed for the sampling cycle of observing the activity of the virtual machine. The VM application may correlate source address, destination address, time of day, type of network activity (i.e., storage access), and duration of network activity to determine which communication activities (i.e., "conversations") are prevalent within the virtual processing environment performed by one or more of the VMs 190.

As a result of auditing and monitoring the VM activity over a predefined time period, the resulting tabular files may be organized to include a list of the top ten most optimum or comprehensive records observed for a particular sampling cycle (e.g., 24 hours, 48 hours, 72 hours, etc.). The VM activity data may be formatted into a tabular limited format. Each line in the record is processed by a SIGINT based frequency algorithm that devises the top ten most optimum records observed for the sampling cycle. The virtualization management vendor API 500 is queried for any errors or failure states observed during the record generation duration period. A list is created by the inference engine 680 of the virtual storage 150 usage and virtual machines' 190 connectivity.

The generated list may be parsed for errors or failures on a per-record basis by the query engine 700, which identifies any records containing critical errors. Those records identified as including critical errors may be dropped. The remaining records are inserted into the 'orchestration' components, including the query engine 700, the knowledge base 600 and the inference engine 680 to assign the virtual machines 190 to the virtual storage device 120 sequentially by utilizing the WSDL 230 to interface with the storage device APIs 130. The WSDL 230 then restarts processing of the inference engine 680 by querying with the query engine 700 the results of operating the virtual machine(s) and corresponding storage connections without allowing dynamic reassignment.

A list of the VM behavior is generated and maintained in the OWL-based knowledge base 600. Any resulting errors or failures may result in the VM system transmitting a message to the orchestration engine 105 by utilizing the orchestration engine WSDL 107 to move to the next record contained within the OWL based knowledge base 600. The process is performed iteratively until all active connections have been attempted. If more than one record results in no errors or failures, the monitoring and/or auditing duration of the VM activity may be doubled (e.g., 24 hours to 48 hours). If the result is the same then each record is used for a period of 72 hours. If the result is still the same, then the user is offered the remaining records as options. This is accomplished by the query engine 700 accessing the knowledge base 600.

According to example embodiments, the list may include an expression of ontology for each record which includes a virtual machine's relationship to storage. For example, "VMWin2k8" has storage device "LUN8890EMC2", and "LUN8890EMC2" provides storage for "VMWin2k8." An error example: would provide a timestamp 0:00:00:39.217, world 01024, adapter LUN8890EMC2, id 000, lun 000, command [0x2A]WRITE(10), and error message [0x5: 0x24:0x0]ILLEGAL REQUEST: Invalid field in CDB[0x0]. As a result of this example error message, a request to perform a write command would be denied.

The types of errors that would occur may include any error tied to the operational relationship of the VM. Such errors may include network latency. For instance, because where the virtual and physical devices exist to a VM, there may be an inherent inability to satisfy the data storage request due to a configuration problem existing when the VM is migrated to a different network statement. From within the VM, a connection is established for all OS types used with virtual machines. The connections may be monitored with 'NETSTAT®'. In operation, the VM "attempts" to establish a connection and the VM system 100 will identify errors that are observed by connecting to the APIs. According to one example, if more than one record results in no errors or failures, the duration may be doubled since the errors need to be discovered so the monitoring duration must be extended. In operation, the inference engine 680 is searching for a lack of errors to account for intermittent errors or errors that have been resolved by virtualization environment management system.

Monitoring virtual machine connectivity or activity may be performed by using a network statistic application (i.e., "NETSTAT®"). For example, NETSTAT® may be a command-line tool that displays network connections for both incoming and outgoing connections, routing tables, and other network interface statistics (e.g., access attempts, packets received, packets transmitted, lost packets, errors, etc.). NETSTAT® may be operated on a UNIX®, UNIX®-compatible, and WINDOWS® based operating systems.

Virtual machine activity may be processed by a hypervisor API 180/210, such as VIX API and by a direct VM API such as WMI. The VIX API (or "Vix") is a library for writing scripts and programs to manipulate virtual machines. It is a high-level and practical interface application for both script developers and application programmers. VIX API may run on MICROSOFT® WINDOWS® (e.g., WINDOWS XP®, WINDOWS SERVER® 2003, or later) and Linux platforms. WINDOWS® management instrumentation (WMI) is the primary management technology for MICROSOFT® WINDOWS® operating systems, which enables consistent and uniform management, control, and monitoring of systems throughout an enterprise. Based on industry standards, WMI allows system administrators to query, change, and monitor configuration settings on desktop and server systems, applications, networks, and other enterprise components. System administrators can write scripts that use the WMI scripting library to work with WMI and create a wide range of systems management and monitoring scripts. WMI is installed natively in the WINDOWS® operating system.

According to example embodiments, a regular machine router, computer, etc., would have a port, address, user name, etc. A virtual machine may maintain all the same connections and attributes as a physical machine. In most cases a virtual machine has no program that establishes it as anything other than a real machine except it does not have its own physical hardware platform. For example, a virtual machine (VM) is a "completely isolated guest operating system installation within a normal host operating system". Virtual machines may be implemented with software emulation and/or hardware virtualization or in most cases both together.

According to example embodiments a critical error may be identified and/or dropped. A critical error may include instances where the hypervisor 180/210 reports an error associated with the operation or allocation of resources to the virtual machine (e.g., unable to process errors, connection errors, memory or processor availability errors, acknowledgement errors, etc). In the computing environment, the hypervisor 180/210, also known as virtual machine manager (VMM), is one of many hardware virtualization techniques allowing multiple operating systems, termed guests, et., to run concurrently on a host computer. The hypervisor is conceptually one level higher than a supervisory program. The hypervisor presents to the guest operating systems a virtual operating platform and manages the execution of the guest operating systems. Multiple instances of a variety of operating systems may share the virtualized hardware resources. In general, a hypervisor, is commonly installed on server hardware, with the function of running guest operating systems, which may in themselves act as servers.

Storage utilization with the virtual machine operation may include error identification and management. For example, errors may be identified from a storage utilization effort and failure. In enterprises where virtualization exists, it is possible to allocate and/or link storage to a virtual machine. Any errors that are presented should be identified and observed by the inference engine 680 to determine what components are operating correctly and which ones are not operating correctly. The virtual machine operation can establish allocation of specific storage to specific virtual machine (VM) dependencies.

Referring again to FIG. 1, storage input/output (IO) 440 represents an operation that is accomplished over a TCP/IP network in virtual environments and may include fiber, Ethernet, SCSII, network attached storage (NAS), or even a serial advanced technology attachment (SATA) connection from the physical host to the physical storage device. This connection is used by the VM system 100 to send and receive file contents and metadata. The virtual storage conduit 450 is accessed by the hypervisor 180/210 abstracting virtual storage based on its actual physical storage connection. Conduit 450 may not be a physical connection but instead a socket connection within the hypervisor layer of the physical virtual machine.

The physical host to virtual machine conduit 520 may be a physical connection that is the connection point between the physical host and the executed virtual machine. The layer of abstraction exists as the hypervisor. The connection point between the virtual machines 190 and the physical virtual host 110 is expressed in network sockets as well as specific conduits such as VMWARE®'s VMtools required in any virtual environment. The virtual machine OS APIs to physical host 530 is a connection that is manifested in two different ways. One connection as an internal OS socket within the hypervisor, and as a network layer API answering on a specific port and address. The system 100 uses this connection to communicate with the virtual machine 190 to determine activity, connectivity, and operating status, and may be used by the system for WMI and NETSTAT® messages.

The virtual machine virtual storage dependency console conduit 410 provides a connection to a physical device. This conduit 410 exists as a physical network connection as any connection from a virtual machine to a physical host, storage device, or another virtual machine. The API interface console WSDL interface 430 is a message conduit for the hypervisor to receive requests and provide responses via HTTP messages. The OWL-based knowledge base 600 is a (Web Ontology Language (OWL)) family of knowledge representation languages for authoring ontologies. The languages are characterized by formal semantics and RDF/XML-based serializations for the semantic web. OWL is endorsed by the world wide web consortium (W3C). The hypervisor API connection to the virtual network 470 is a connection to a physical device which operates as a virtual network connection existing within the hypervisor layer on the physical host, and may be transported over a socket. Alternatively, this connection 470 may be abstracted into TCP/IP/HTTP network messages for requests originating over the physical network.

The network physical router 170 is a physical device that operates as a router device that forwards data packets between computer networks, creating an overlay internetwork. A router is connected to two or more data lines from different networks. When a data packet arrives on one of the lines, the router 170 reads the address information in the packet to determine its ultimate destination. Then, using information in its routing table or routing policy, it directs the packet to the next network on its way to its intended destination.

The knowledge base to database connection 550 provides a file access to a physical device. This connection 550 represents the OWL knowledge base that is persisted in a database as an empty space when not executing in memory. The OWL based inference engine to OWL knowledge base engine connection 555 is a socket connection in the form of JSON messages. Alternatively, this connection 555 may be abstracted into TCP/IP/HTTP network messages. The OWL based inference engine to OWL based query engine connection 580 is a standard socket connection in the form of JSON messages, or alternatively, this may be abstracted into TCP/IP/HTTP network messages.

Network connectivity to storage (490) is a physical connection from the storage devices 120 to the network infrastructure. This is typically a TCP/IP, fiber, or direct Ethernet connection. The virtual network 160 is a virtual computer network that includes, at least in part, virtual network links.

A virtual network link is a link that does not include a physical (wired or wireless) connection between two computing devices but is implemented using network virtualization. The two most common forms of virtual networks are protocol-based virtual networks (such as VLANs, VPNs, and VPLSs) and virtual networks that are based on virtual devices, such as the networks connecting virtual machines inside a hypervisor. In practice, both forms can be used in conjunction. The virtual machine 190 (VM) is a completely isolated guest operating system installation within a normal host operating system. Modern virtual machines are implemented with either software emulation or hardware virtualization or (in most cases) both together. The physical storage devices 120 are logical unit number or (LUN) identified entities which operate as computer storage. The logical unit number or LUN is a number used to identify a logical unit, which is a device addressed by the SCSI protocol or similar protocols such as fiber channel or iSCSI. A LUN may be used with any device which supports read/write operations, such as a tape drive, but is most often used to refer to a logical disk as created on a SAN. Though not technically correct, the term "LUN" is often also used to refer to the drive itself.

The hypervisor's API 210 may be a VIX API that assists with writing programs and scripts to automate virtual machine operations and run programs that manipulate files within guest operating systems. VIX programs run on WINDOWS® or Linux and support management of VMWARE® Workstation, Player, and ESX/ESXi, optionally through vCenter. Bindings are provided for C, PERL®, and COM (VISUAL BASIC®, VBscript, C#, etc.). The inference engine 230 may provide drools, which are an Object-oriented rules engine for JAVA™. Drools is an augmented implementation of an algorithm tailored for the JAVA™ language. Adapting to an object-oriented interface allows for more natural expression of business rules with regards to business objects. More importantly, Drools provides for declarative logic programming and is flexible enough to match the semantics of your problem domain. The various parts that compose a rule may be extended to lend domain-specific sense to the rule.

The virtual machine OS API 194 is a WINDOWS® management instrumentation (WMI) OS API, which is an infrastructure for management data and operations on WINDOWS®-based operating systems. You can write WMI scripts or applications to automate administrative tasks on remote computers but WMI also supplies management data to other parts of the operating system and products, for example a system center operations manager, or WINDOWS® remote management (WinRM). The query engine 232 operates 'OPENRULES®', which is a full-scale open source business rules management framework. It efficiently uses the power of MS EXCEL®, Eclipse IDE and open source JAVA™ libraries to create, deploy, execute, and maintain different rule engines with complex business logic controlled by business analysts.

Figure 2:
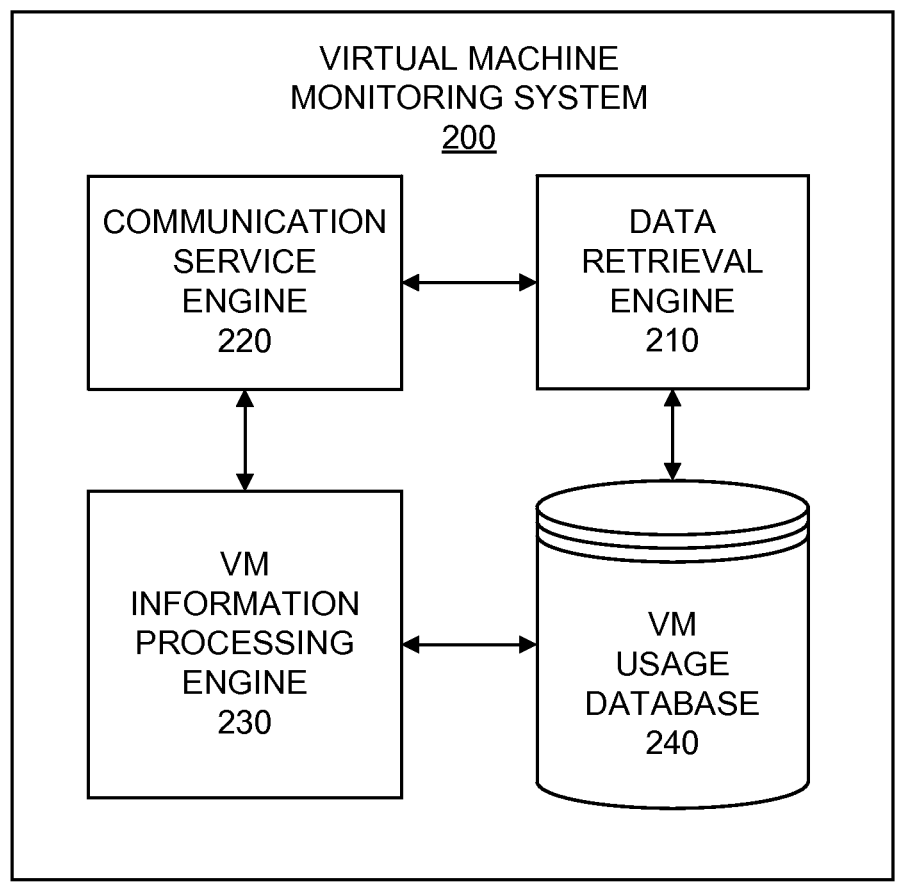
FIG. 2 illustrates an example virtual machine monitoring system configured to perform various operations associated with the example embodiments.

FIG. 2 illustrates an example system configuration 200 configured to support various embodiments of the present invention. Referring to FIG. 2, a virtual machine (VM) operating system 200 may include a VM usage database 240 that stores various metrics and usage statistics and other recorded information pertaining to the logged usage of the VMs operating in the VM system 100. According to one example operation, a request may be transmitted from a physical host device to monitor at least one virtual machine among a plurality of virtual machines currently operating in the virtual communication system. The request may be received and processed by the data retrieval engine 210 which then retrieves logged VM usage information stored in the database 240. The data retrieval engine may also determine which of the plurality of virtual machines are actively accessing a predetermined virtual application or have accessed a virtual application in the past from results stored in the database 240. The VM information processing engine 230 may sort out of the results and fulfill the request by offering the information requested among a plurality of different VM activity records. The communication service engine 220 may then transmit the present operating activity results regarding the plurality of virtual machines responsive to the transmitted request. The results may be sent to the requesting entity operating inside or outside the VM system.

The request may be transmitted via an application programming interface (API) type application and corresponding socket or virtual connection. The predetermined virtual application may be a virtual storage application that is used to store data via the VMs. The request may be generated and transmitted at a default time interval and/or periodically to ensure that accurate VM behavior and activity is logged and may be retrieved to create a baseline and/or profile. The present operating activity results may include a particular host communicating with one or more of the plurality of virtual machines and transferring any one or more of virtual machine names, a present time, a type of connection established with the plurality of virtual machines, a duration of the connection, storage capacity information, a number of packets transferred, a number of bits transferred, an origination source address, and a storage destination address.

The VM processing engine 230 may also operate to create a usage profile of the virtual machine's usage of a storage resource and determine an optimum usage metric based on the usage profile. Examples of optimum usage metrics may include at least one of memory size, memory access times, memory access frequency, number of read/write operations performed and optimal file size storage.

Example embodiments are preferably realized in a hardware device, such as, a computer, cellular phone, or other mobile terminal device, etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network element 300, which may represent any of the above-described network components of the other figures.

Figure 3:
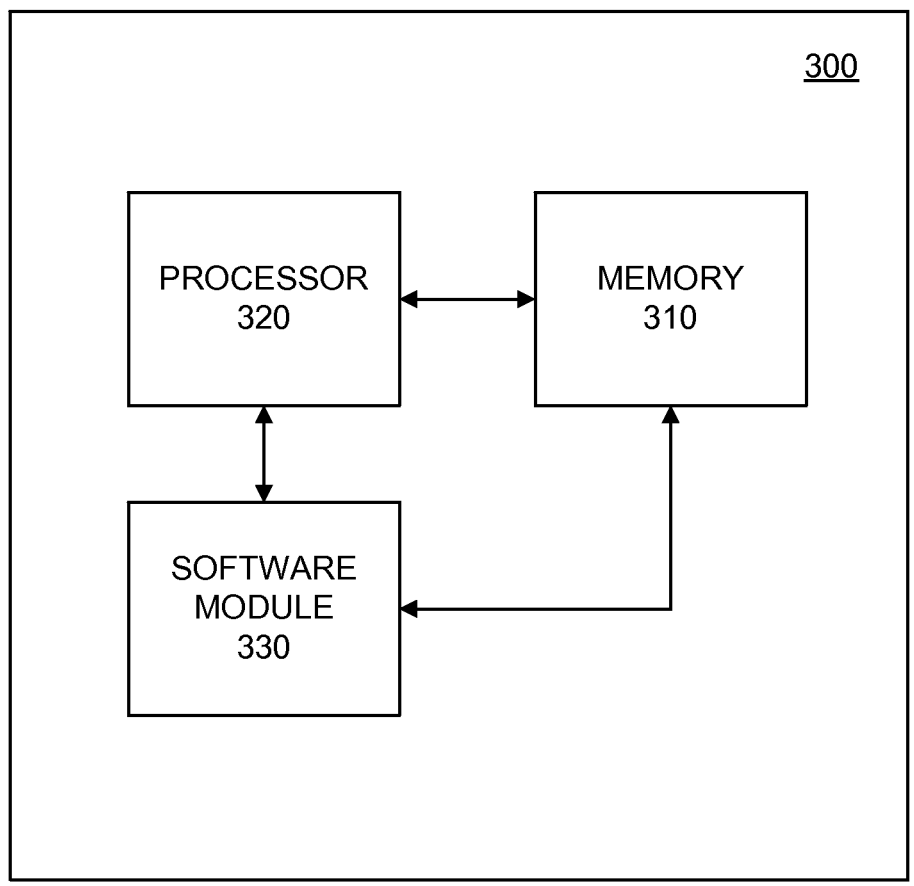
FIG. 3 illustrates an example network entity configured to store instructions and processing hardware for performing operations according to example embodiments of the present invention.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
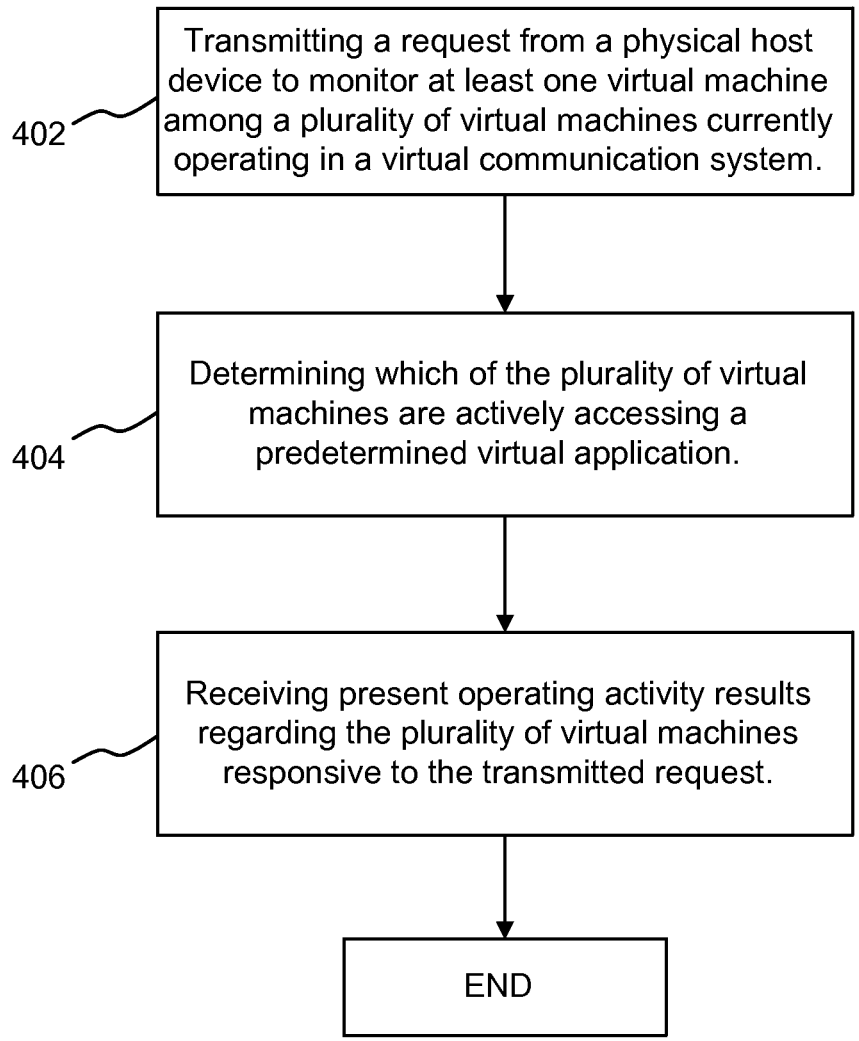
FIG. 4 illustrates an example flow diagram of a method of operation according to example embodiments of the present invention.

FIG. 4 illustrates an example method of operation according to example embodiments. Referring to FIG. 4, the example method of operation may include transmitting a request from a physical host device to monitor at least one virtual machine among a plurality of virtual machines currently operating in a virtual communication system at operation 402. the method may also include determining which of the plurality of virtual machines are actively accessing a predetermined virtual application at operation 404, and receiving present operating activity results regarding the plurality of virtual machines responsive to the transmitted request at operation 406.

Although an exemplary embodiment of the system, method, apparatus and non-transitory computer readable storage medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems 100 and 200 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
transmitting a request from a physical host device to monitor at least one virtual machine among a plurality of virtual machines currently operating in a virtual communication system;
determining which of the plurality of virtual machines are actively accessing a predetermined virtual application;
receiving present operating activity results regarding the plurality of virtual machines responsive to the transmitted request;
monitoring the at least one virtual machine for a predetermined period of time to identify a specific interaction level of memory access operations performed during the predetermined period of time and identified during an interaction between the at least one virtual machine and the predetermined virtual application;
intercepting network traffic signals associated with the at least one virtual machine during the memory access operations; and
creating a memory usage profile for the virtual machine based on the predetermined period of time and the network traffic signals;
wherein the present operating activity results comprises a particular host communicating with one or more of the plurality of virtual machines and transferring a type of connection established with the plurality of virtual machines, a duration of the connection, a number of packets transferred, an origination source address, and a storage destination address.

2. The method of claim 1, wherein the request is transmitted via an application programming interface (API).

3. The method of claim 1, wherein the predetermined virtual application is a virtual storage application.

4. The method of claim 1, wherein the request is generated and transmitted at a default time interval.

5. The method of claim 1, wherein the present operating activity results comprises the particular host communicating with the one or more of the plurality of virtual machines and transferring at least one of virtual machine names, a present time, storage capacity information, and a number of bits transferred.

6. The method of claim 1, further comprising:
determining at least one usage metric based on the memory usage profile.

7. The method of claim 6, wherein the at least one usage metric comprises at least one of memory size, memory access times, memory access frequency, number of read/write operations performed and file size storage.

8. An apparatus comprising:
a hardware transmitter configured to transmit a request from a physical host device to monitor at least one virtual machine among a plurality of virtual machines currently operating in a virtual communication system;
a processor configured to determine which of the plurality of virtual machines are actively accessing a predetermined virtual application; and
a receiver configured to receive present operating activity results regarding the plurality of virtual machines responsive to the transmitted request, and
wherein the processor is further configured to
monitor the at least one virtual machine for a predetermined period of time to identify a specific interaction level of memory access operations performed during the predetermined period of time and identified during an interaction between the at least one virtual machine and the predetermined virtual application,
intercept network traffic signals associated with the at least one virtual machine during the memory access operations, and
create a memory usage profile for the virtual machine based on the predetermined period of time and the network traffic signals;
wherein the present operating activity results comprises a particular host communicating with one or more of the plurality of virtual machines and transferring a type of connection established with the plurality of virtual machines, a duration of the connection, a number of packets transferred, an origination source address, and a storage destination address.

9. The apparatus of claim 8, wherein the request is transmitted via an application programming interface (API).

10. The apparatus of claim 8, wherein the predetermined virtual application is a virtual storage application.

11. The apparatus of claim 8, wherein the request is generated and transmitted at a default time interval.

12. The apparatus of claim 8, wherein the present operating activity results comprises the particular host communicating with the one or more of the plurality of virtual machines and transferring at least one of virtual machine names, a present time, storage capacity information, and a number of bits transferred.

13. The apparatus of claim 8, wherein the processor is further configured to
determine at least one usage metric based on the memory usage profile.

14. The apparatus of claim 13, wherein the at least one usage metric comprises at least one of memory size, memory access times, memory access frequency, number of read/write operations performed and file size storage.

15. A non-transitory computer readable storage medium configured to store instructions that when executed cause a processor to perform:
hardware transmitting a request from a physical host device to monitor at least one virtual machine among a plurality of virtual machines currently operating in a virtual communication system;
determining which of the plurality of virtual machines are actively accessing a predetermined virtual application;
receiving present operating activity results regarding the plurality of virtual machines responsive to the transmitted request;
monitoring the at least one virtual machine for a predetermined period of time to identify a specific interaction level of memory access operations performed during the predetermined period of time and identified during an interaction between the at least one virtual machine and the predetermined virtual application;
intercepting network traffic signals associated with the at least one virtual machine during the memory access operations; and
create a memory usage profile for the virtual machine based on the predetermined period of time and the network traffic signals;
wherein the present operating activity results comprises a particular host communicating with one or more of the plurality of virtual machines and transferring a type of connection established with the plurality of virtual machines, a duration of the connection, a number of packets transferred, an origination source address, and a storage destination address.

16. The non-transitory computer readable storage medium of claim 15, wherein the request is transmitted via an application programming interface (API).

17. The non-transitory computer readable storage medium of claim 15, wherein the predetermined virtual application is a virtual storage application.

18. The non-transitory computer readable storage medium of claim 15, wherein the request is generated and transmitted at a default time interval.

19. The non-transitory computer readable storage medium of claim 15, wherein the present operating activity results comprises the particular host communicating with the one or more of the plurality of virtual machines and transferring at least one of virtual machine names, a present time, storage capacity information, and a number of bits transferred.

20. The non-transitory computer readable storage medium of claim 15, wherein the processor is further configured to perform:

determining at least on usage metric based on t the memory usage profile and wherein the at least one usage metric comprises at least one of memory size, memory access times, memory access frequency, number of read/write operations performed and file size storage.

\* \* \* \* \*